United States Patent [19]

Wrege et al.

[11] Patent Number: 4,745,347

[45] Date of Patent: May 17, 1988

[54] LOW COST INSTANT REVERSING CIRCUIT

[75] Inventors: Richard A. Wrege; Victor A. Murn, both of Muskego; Dennis K. Lorenz, Brookfield, all of Wis.

[73] Assignee: PT Components, Inc., Brookfield, Wis.

[21] Appl. No.: 911,009

[22] Filed: Sep. 24, 1986

[51] Int. Cl.⁴ .............................................. H02P 3/20
[52] U.S. Cl. .................................... 318/744; 318/739
[58] Field of Search .............. 318/739, 740, 744, 749, 318/751–756, 763, 782, 786, 257; 361/84, 77, 23, 33

[56] References Cited

U.S. PATENT DOCUMENTS

| | | | |
|---|---|---|---|
| 2,545,639 | 3/1951 | Wolff et al. | 318/754 |
| 3,048,756 | 8/1962 | Voege | 318/749 |
| 3,432,736 | 3/1969 | Van Emden | 318/749 |
| 4,604,563 | 8/1986 | Min . | |
| 4,622,506 | 11/1986 | Shemanske et al. . | |
| 4,658,195 | 4/1987 | Min . | |
| 4,670,697 | 6/1987 | Wrege et al. . | |

*Primary Examiner*—David Smith, Jr.
*Attorney, Agent, or Firm*—Andrus, Sceales, Starke & Sawall

[57] ABSTRACT

In a single phase AC induction motor having a main winding (1) and an auxiliary winding (2) both connectable to an AC power source (4), and having a start switch (6, 74) for automatically connecting and disconnecting the auxiliary winding (2) to and from the AC source (4) in starting and running modes, respectively, and having a user operated reversing switch (207-212) for reversing the voltage polarity applied from the AC source (4) to one of the windings relative to the other winding, low cost circuitry is provided for detecting the polarity reversal by sensing when one of the main and auxiliary winding voltages shifts from a leading to a lagging position relative to the other winding voltage, whereupon the circuit automatically instantly reconnects the auxiliary winding (2) to the AC source (4) to immediately apply reverse torque. A first voltage comparator (221) senses a given polarity and magnitude of main winding voltage, and a second voltage comparator (222) senses a given polarity and magnitude of auxiliary winding voltage. The output of the second comparator (222) is differentiated (282), and a third voltage comparator (223) compares output pulses (270) from the first comparator (221) and differentiated output pulses (288) from the second comparator (222) and instantaneously senses polarity reversal when one of the pulses shifts relative to the other, and in turn actuates the start switch (6, 74).

4 Claims, 3 Drawing Sheets

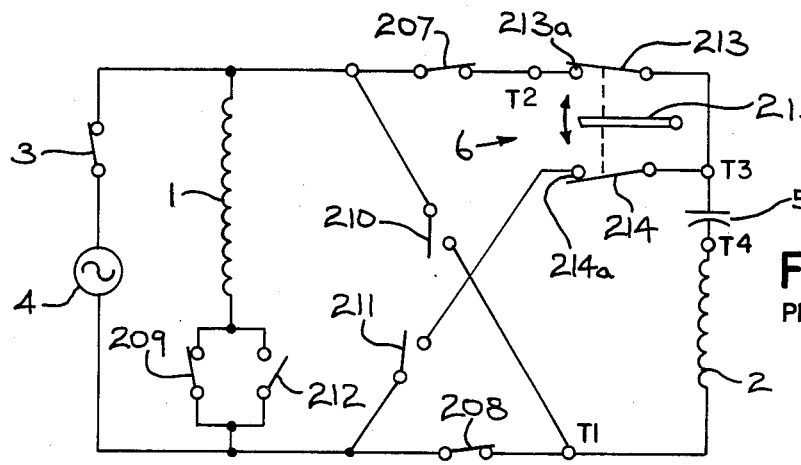
FIG. 1
PRIOR ART
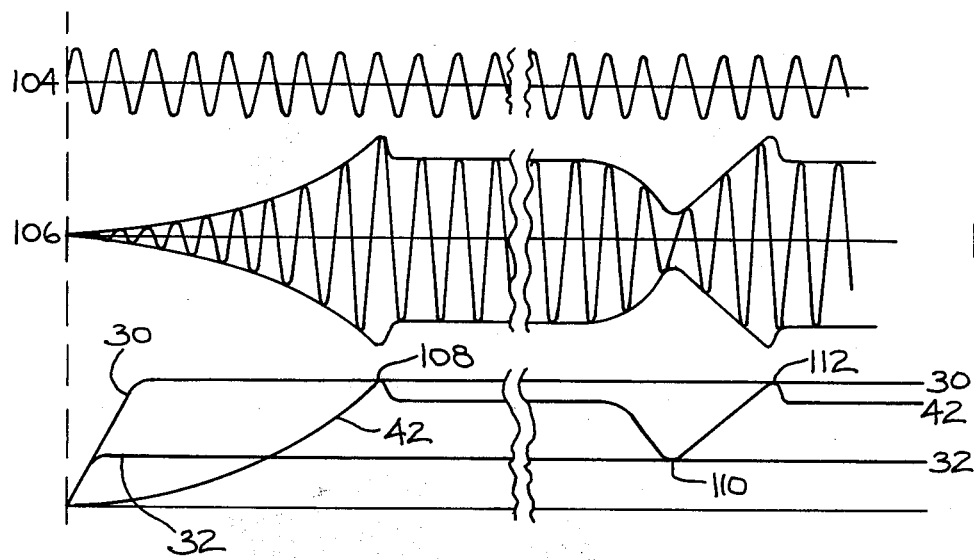
FIG. 3
FIG. 4
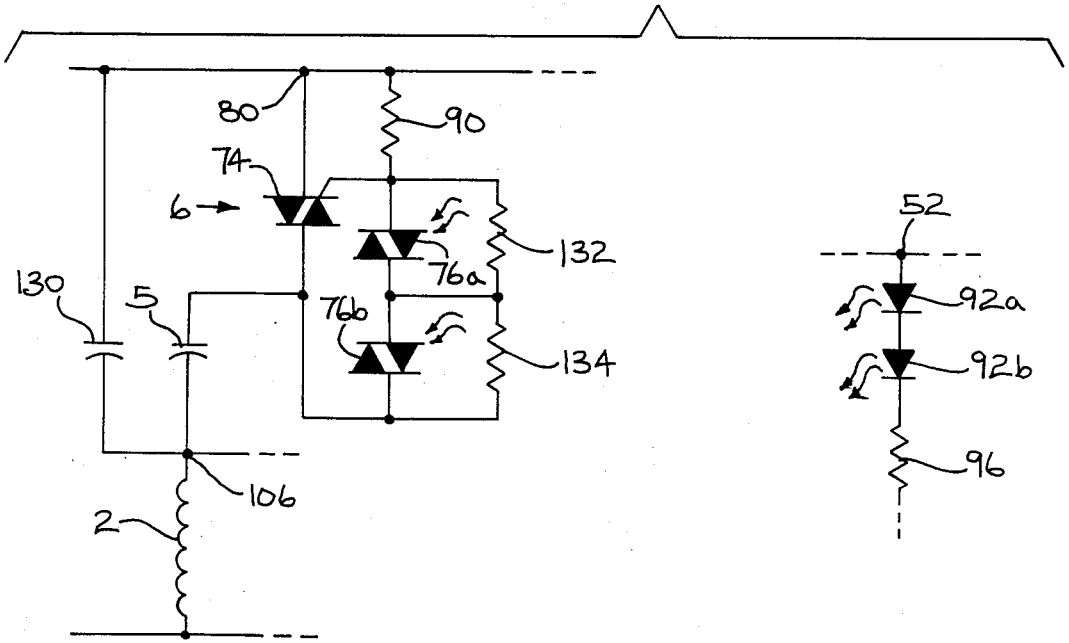

INSTANT REVERSE TIMING

4,745,347

LOW COST INSTANT REVERSING CIRCUIT

BACKGROUND AND SUMMARY

The invention relates to a system for quickly reversing the direction of rotation of a single phase AC induction motor. The invention particularly relates to improvements in reduced cost and part content over commonly owned co-pending U.S. application Ser. No. 06/834,208, filed Feb. 27, 1986, "Instant Reversing Circuit", Palaniappan, hereby incorporated herein by reference.

When trying to quickly reverse a single phase AC motor, the mere reversal of voltage polarity applied to the main and auxiliary windings of the motor while it is running will not reverse the motor. That is, the applied voltage to the main winding reverses polarity each half cycle, regardless of whether it is positive during the first or second half cycle, and without interaction with the auxiliary winding, no reversal can take place.

One possibility for reversing the motor is to stop the motor, and then reenergize the start winding in the opposite polarity relative to the main winding, or vice versa. This would make the motor rotate in the opposite direction. This method of stopping the motor before reversal is undesirable or unacceptable in various applications where instant reversal while running in a certain direction is needed or desired, for example an electric hoist motor.

In another known reversing system, a mechanical centrifugal disconnect switch is used in combination with a mechanical reversing switch manually operated by the user. The user operated reversing switch controls a first set of external switches for applying a first polarity voltage to the start winding from the AC source, and controls a second set of external switches for applying a second opposite polarity voltage to the start winding from the AC source. The centrifugal switch is normally closed at initial energization of the motor, to connect the start winding to the AC power source. The centrifugal switch automatically opens when the motor speed is approximately 80% of synchronous speed, causing the start winding to be disconnected from the AC power source. The centrifugal switch has two pairs of contacts, a first pair for supplying current through the start winding in one direction when its associated set of external switches are closed, and a second pair of contacts for supplying current through the start winding in the opposite direction when its associated set of external switches are closed. At initial energization of the motor, both pairs of contacts are closed and one set of external switches is closed, to supply current in one direction through the start winding. As the motor starts to rotate, a wiper actuator is frictionally dragged by motor rotation to a first given position adjacent the first pair of contacts, and when the centrifugal actuator operates, it causes the wiper actuator to open the first pair of centrifugal switch contacts to disconnect the start winding from the AC power source. During the running mode, when the operator manually actuates the external reversing switches, a different electrical circuit is completed, which is through the closed second pair of centrifugal switch contacts, to supply current through the start winding in the opposite direction and hence apply reverse torque to the motor. As the motor slows down, the centrifugal switch closes which in turn moves the wiper actuator axially and closes the first pair of centrifugal switch contacts which are now in an open circuit. When the motor starts rotating in the opposite direction, the wiper actuator is frictionally dragged to a second position adjacent the second pair of centrifugal switch contacts. When the motor speed reaches approximately 80% of synchronous speed in such opposite direction of rotation, the centrifugal switch opens which in turn moves the wiper actuator axially to open the second pair of contacts and disconnect the start winding from the AC power source. The cycle may repeat, with the operator manually actuating the external reversing switches to complete an electrical circuit through the first pair of contacts. This type of switching arrangement is typically known in the trade as an "iron fireman" arrangement. Another example is a General Electric Reverswitch R98-1, 8422. Such arrangement provides instant reversing (i.e., immediate application of reverse torque) because the wiper actuator has been moved by rotation of the motor in its running condition to be ready and in the proper position for motor reversal. While this type of arrangement has proven useful for its intended purpose, it is nonetheless subject to the problems inherent in a mechanical type actuation system, including limited life, excessive contact arching due to random switching, fatigue, friction, particularly the dragging of the wiper actuator, vibration, mounting position, contact and wiper actuator wear, and so on.

As with the above noted Palaniappan application, the present invention addresses and solves the above noted single phase motor instant reversing and other problems and provides an electronic system electrically sensing polarity reversal and automatically reconnecting the start winding to the AC source. The instant reversing technique is independent of the contact transfer time of the reversing switch. For example, the operator of a hoist can go instantly from up to down without having to momentarily delay the reversing switch in a central off position before continuing to the reversed direction position. In the Palaniappan application and in the present invention, polarity reversal is instantly detected and recognized by sensing when one of the main and auxiliary winding voltages shifts from a leading to a lagging position relative to the other, and the auxiliary winding is instantly reconnected to the AC source such that the reversed polarity between the main and auxiliary windings begins applying reverse torque to the motor, slowing the motor down and accelerating it in the opposite direction of rotation.

BRIEF DESCRIPTION OF THE DRAWINGS

FIG. 1 schematically shows a reversing switch arrangement known in the prior art.

FIG. 3 is a wave form diagram illustrating operation of the starting circuitry of FIG. 2, and in accordance with commonly owned co-pending U.S. application Ser. No. 06/885,087, filed July 14, 1986, now U.S. Pat. No. 4,670,697, "Low Cost, Load And Speed Sensitive Motor Control Starting Circuit", Wrege et al, hereby incorporated herein by reference.

FIG. 4 is a partial isolated circuit diagram of a modification of FIG. 2 in accordance with the noted co-pending Wrege et al application.

DETAILED DESCRIPTION

Figure 2:
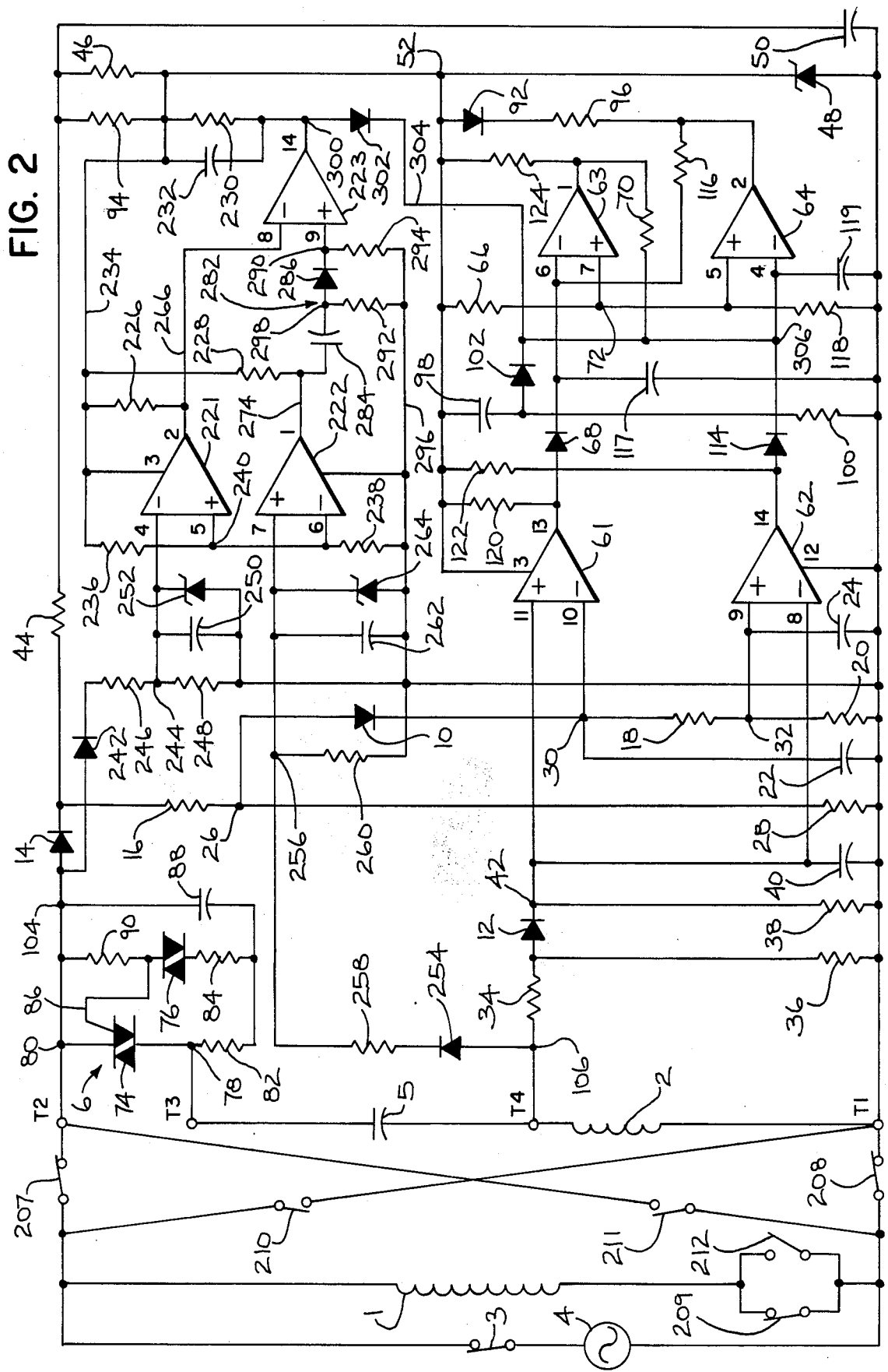
FIG. 2 is a circuit diagram of circuitry constructed in accordance with the invention.

A single phase AC induction motor has a main winding for running the motor, and a start or auxiliary winding for starting the motor wherein the auxiliary winding is energized when starting the motor from rest and then in many cases disconnected at a given motor speed. The fields in the main and auxiliary windings are phase shifted, for example by capacitance, inductance, resistance or the like, to establish starting and/or running torque.

FIG. 1 shows a known capacitor start motor starting system, and including a reversing circuit. Main winding 1 and auxiliary winding 2 of the single phase AC induction motor are connected through main power switch 3 to an AC power source 4. Capacitor 5 provides additional phase shift for starting torque. When the motor reaches a given threshold speed, switch 6 is opened to disconnect auxiliary winding 2 from AC power source 4.

Various types of switches 6, and controls therefore, are known. In one arrangement, a mechanical switch and centrifugal actuator are mounted on the motor shaft or rotor. At a given threshold speed, centrifugal weights are displaced radially outwardly to open the switch. A particular type of mechanical centrifugal switch which may be used in reversing applications is commonly known as an "iron fireman" switch as used in the hoist industry. Another example of switch 6 is a General Electric Reverswitch R98-1, 8422.

FIG. 1 shows an up condition of switch 6, with external user operated up switches 207, 208 and 209 closed, and external user operated down switches 210, 211 and 212 open. In this configuration, the same polarity voltage from source 4 is applied to both windings 1 and 2, and current flows in the same direction through the windings during each half cycle. Switch 6 is a mechanical direction sensitive centrifugal switch and is closed when the motor is at rest and during starting, and opens when the motor reaches a designated speed, to disconnect auxiliary winding 2 from the AC power source 4.

Switch 6 includes a first cantilever contact arm 213 normally engaging stationary contact 213a. Switch 6 includes a second cantilever contact arm 214 normally engaging stationary contact 214a. At rest and during starting when the centrifugal switch is closed it holds a wiper actuator 215 out of engagement with contact arms 213 and 214. During starting when the motor begins to rotate, it frictionally drags wiper actuator 215 to a first position depending on the direction of rotation, for example clockwise in FIG. 1 to a position adjacent contact arm 213. When the motor reaches the designated speed and the centrifugal actuator operates, it actuates wiper actuator 215 such that the latter moves to strike contact arm 213 to disengage it from contact 213a and open contacts 213 and 213a, to thus disconnect auxiliary winding 2 from AC source 4. The motor is now in its running condition.

During the above noted running condition, contacts 214 and 214a are closed, but are in an open circuit because down switches 210 and 211 are open. When the user manually operates the reversing switch to its down position, up switches 207, 208 and 209 are opened, and down switches 210, 211 and 212 are closed. This connects main and auxiliary windings 1 and 2 in opposite polarity relation to AC power source 4. For example, during the first half cycle of AC power source 4, current flows downwardly through main winding 1. Also during such first half cycle, current flows from AC power source 4 downwardly through closed switch 210, then upwardly through auxiliary winding 2, capacitor 5, and then through contact arm 214 and contact 214a and then downwardly through closed switch 211. Reverse torque is thus applied to the motor, and the motor slows down to zero speed and then accelerates in the opposite direction of rotation. When the motor slows down below a designated cut-in speed, the centrifugal switch closes which moves wiper actuator 215 out of engagement with contact arm 213, allowing contacts 213 and 213a to re-close. Contacts 213 and 213a are now in an open circuit because switches 207 and 208 are open. When the motor begins rotating in the opposite direction, it frictionally drags wiper actuator 215 in such opposite direction, e.g., counterclockwise in FIG. 1, to a second position adjacent contact arm 214. When the motor reaches a designated cut-out speed in such opposite direction of rotation, the centrifugal actuator operates and actuates wiper actuator 215 such that the latter moves to strike contact arm 214 to disengage it from stationary contact 214a, and thus open contacts 214 and 214a to disconnect auxiliary winding 2 from AC source 4.

FIG. 2 shows electronic circuitry replacing the mechanical centrifugal type "iron fireman" switch. FIG. 2 uses like reference numerals from FIG. 1 where appropriate to facilitate clarity. In the preferred embodiment, the electronic system of the invention is used in combination with motor starting circuitry shown the above noted Wrege et al application, relating to a low cost, load and speed sensitive motor control starting circuit and start winding disconnect system sensing and comparing relative magnitudes of main and start winding voltages.

FIG. 2 shows circuitry for controlling disconnect or start switch 6, including starting circuitry in accordance with the above noted Wrege et al application, and also shows instant reversing circuitry in accordance with the present invention.

The circuitry in FIG. 2 is connected to terminals T1, T2, T3 and T4 as shown, corresponding to the same terminals T1–T4 in FIG. 1 of the user operated double throw multipole reversing switch. The circuitry controls start switch 6, provided by power triac 74, for automatically connecting and disconnecting auxiliary winding 2 to and from AC source 4 in starting and running modes, respectively. The user operated reversing switch is shown at 207–212 for reversing the voltage polarity applied from the AC source to one of the windings relative to the other winding. The circuitry electrically senses this polarity reversal during the running mode and automatically reconnects auxiliary winding 2 to AC source 4 by closing switch 6, namely biasing power triac 74 into conduction, to be described.

A main voltage detector circuit, including diode 10, is connected across main winding 1 for sensing the magnitude of the AC main winding voltage. Main winding voltage is sensed through rectifying diodes 14 and 10 and resistors 16, 18, 20 and 28 and filtered by capacitors 22 and 24. The voltage at node 26 is reduced by the voltage divider provided by resistor 16 on one side of the node and the parallel combination of resistor 28 and series resistors 18 and 20 on the other side of the node. The voltage at node 30 is the voltage at node 26 less the drop across diode 10. The voltage at node 32 is the voltage at node 30 reduced by the voltage divider provided by resistors 18 and 20. The voltages at nodes 30 and 32 are derived from the AC line and provide reference voltages relative thereto for the cut-out comparator 61 and for the cut-in or restart comparator 62, to be described. These cut-out and cut-in reference voltages vary with the line voltage and thus provide compensation of same, and allow the cut-out speed and the cut-in restart speed of the motor to be relatively independant of line voltage. The cut-in restart voltage at node 32 is less than the cut-out voltage at node 30.

An auxiliary voltage detector circuit, including diode 12, is connected across auxiliary winding 2 for sensing the magnitude of the AC auxiliary winding voltage. The auxiliary winding voltage is reduced by the voltage divider network provided by resistors 34 and 36 and sensed through half wave rectifying diode 12 and resistor 38 and filtered by capacitor 40. The sensed auxiliary winding voltage at node 42 is supplied to both the cut-out comparator 61 and the cut-in restart comparator 62 for comparison against the respective floating main winding AC line reference voltages.

A half wave rectified DC power supply is provided from the AC source through diode 14 and resistors 44, 46 and 94 clamped by zener diode 48 and filtered by capacitor 50 to provide a fixed DC reference voltage at node 52, in this case 12 volts, for powering the control circuitry, to be described.

As in commonly owned co-pending allowed application Ser. No. 680,489, filed Dec. 11, 1984, "Load And Speed Sensitive Motor Starting Circuit", Shemanske et al, hereby incorporated herein by reference, the circuitry in FIG. 2 utilizes a quad comparator chip, such as an LM339, wherein manufacturer designated pin number assignments are shown for clarity. First, second, third and fourth comparators on the chip are respectively shown at 61, 62, 63 and 64. In the present application and in the above noted Wrege et al application, the flip flop 21 in FIG. 4 of the above noted Shemanske et al application is eliminated, and the flip flop function is provided by a hard wire connection between the comparators, to be described.

The minus input at pin 10 of comparator 61 is used as the reference input and is connected to node 30. The plus input at pin 11 of comparator 61 is the comparing input and is connected to node 42. When the magnitude of the auxiliary winding voltage at node 42 increases to or above a predetermined cut-out value relative to the magnitude of the main winding voltage at node 30 as a function of motor speed corresponding to a given cut-out speed, the output of comparator 61 at pin 13 provides a turn-off signal by going high. Third comparator 63 has a plus input at pin 7 which is used as the reference input and is connected through resistor 66 to the regulated DC supply at node 52 and receives a reduced voltage at node 72 as divided down by the voltage divider provided by resistors 66 and 118. The minus input at pin 6 of comparator 63 is the comparing input and receives the turn-off high signal from comparator 61 through diode 68, which high signal at pin 6 causes the output of comparator 63 at pin 1 to go low. Comparator 63 compares the output of comparator 61 against the reference voltage at node 72 from the DC power supply at node 52 and outputs a low turn-off signal at pin 1 when the high turn-off signal at pin 6 rises in a given polarity direction to or above a predetermined value relative to the reference voltage at pin 7. The low turn-off signal at pin 1 is supplied through resistor 70 to the fourth comparator 64 at pin 4 which is the minus input and is used as the comparing input for comparator 64. The plus input of comparator 64 at pin 5 is the reference input and is connected with pin 7 of comparator 63 at common node 72. When output pin 1 of comparator 63 goes low, the input pin 4 of comparator 64 likewise goes low, and in turn output pin 2 of comparator 64 goes high which provides a turn-off signal to switch 6, which in turn disconnects auxiliary winding 2 from AC source 4, to be described. Voltage comparator 64 compares at input pin 4 the output of comparator 63 against the reference voltage at pin 5 and outputs the high turn-off signal at pin 2 when the low turn-off signal from comparator 63 decreases in a given polarity direction to or below a predetermined value relative to the reference voltage at pin 5.

Switch 6 includes an optically isolated triac driver, as known in the art, for example an MOC3023. Switch 6 includes a power triac 74 in series with capacitor 5 and auxiliary winding 2 across AC source 4, and a gate circuit including light responsive triac 76 for controlling conduction of triac 74. Triac terminal 78 is connected to one side of capacitor 5, and triac terminal 80 is connected to AC source 4. When terminal 78 is positive with respect to terminal 80, and triac 76 is conductive, current flows from terminal 78 through limiting resistors 82 and 84 and through triac 76 to the gate 86 of triac 74 to bias the latter into conduction such that starting current will flow through triac 74 between terminals 78 and 80. Capacitor 88 and resistor 82 provide a snubber network for optotriac driver 76. Resistor 90 provides gate stability. Light responsive triac 76 is optically coupled to LED 92 and is activated by the latter to initiate conduction of triac 76 and in turn conduction of triac 74. When output pin 2 of comparator 64 goes low, a circuit is completed from the regulated DC supply at node 52 through LED 92 and resistor 96, whereby light is emitted from LED 92 to light responsive triac 76 to activate the latter.

Initialization means is provided by an RC timing circuit including capacitor 98 and resistor 100. At initial turn-on upon closure of switch 3, current flows from node 52 through capacitor 98 and diode 102 to input pin 4 of comparator 64 causing the latter's output at pin 2 to go low which turns on LED 92 and triacs 76 and 74, hence connecting auxiliary winding 2 to AC power source 4 at initial energization of the motor. When the motor reaches the cut-out speed, the voltage at node 42 at input pin 11 of comparator 61 rises to the predetermined cut-out value relative to the voltage at node 30 at input pin 10 of comparator 61, and the output of comparator 61 at pin 13 goes high, which turn-off signal is supplied to input pin 6 of comparator 63 causing the latter's output at pin 1 to go low, which low turn-off signal is supplied through resistor 70 to input pin 4 of comparator 64 causing the latter's output at pin 2 to go high, which high turn-off signal prevents conduction through diode 92 and hence turns off triac 76 which turns off triac 74, thus disconnecting auxiliary winding 2 from AC source 4.

FIG. 3 shows the AC line voltage across main winding 1 as appearing at node 104, and also shows the auxiliary winding voltage as appearing at node 106. FIG. 3 also shows the filtered half wave rectified AC line cut-out reference voltage at node 30, the filtered half wave rectified AC line cut-in reference voltage at node 32, and the filtered half wave rectified auxiliary winding voltage at node 42. At cut-out, the filtered half wave rectified auxiliary winding voltage at node 42 rises to the filtered half wave rectified AC line cut-out reference voltage at node 30, as shown at cross-over 108, and auxiliary winding 2 is disconnected from AC source 4 as above described. The magnitudes of the main and auxiliary winding voltages are compared, as above described, and auxiliary winding 2 is disconnected when the auxiliary winding voltage at node 42, including the components from AC source 4 and from rotationally induced voltage due to rotation of the rotor, increases to a predetermined cut-out value such as 108 relative to the main winding voltage at node 30.

After auxiliary winding 2 is disconnected from AC source 4, there is still a voltage appearing across auxiliary winding 2 due to the rotation of the rotor which rotationally induces voltage in auxiliary winding 2. Restart or cut-in comparator 62 senses rotationally induced voltage in the auxiliary winding during running of the motor after starting, i.e. after auxiliary winding 2 is disconnected from AC source 4. Cut-in or restart comparator 62 detects a given decrease in the induced auxiliary winding voltage, as at cut-in cross-over 110, FIG. 3, corresponding to an overload condition of the motor, at which time comparator 62 generates the above noted turn-on signal at its output pin 14 to turn on switch 6 and reconnect auxiliary winding 2 to AC source 4 to thus re-energize the auxiliary winding. The motor is automatically restarted, without manual intervention. If the motor gains speed, the magnitude of the voltage at node 42 again increases to or above the predetermined cut-out value relative to the voltage at node 30, as at cross-over 112, and switch 6 is turned off, again disconnecting auxiliary winding 2 from AC source 4 after the automatic restart. Cut-in speed is less than cut-out speed.

When the rotationally induced voltage across auxiliary winding 2 at node 42 and input pin 8 of comparator 62 decreases to a predetermined cut-in value relative to the magnitude of the main winding voltage at node 32 and input pin 9 as a function of motor speed corresponding to a given cut-in speed, the output of comparator 62 at pin 14 goes high and provides a turn-on signal. This high turn-on signal is supplied through diode 114 to input pin 4 of comparator 64 causing the latter's output at pin 2 to go low which in turn enables conduction through LED 92 and hence activates triacs 76 and 74 to connect auxiliary winding 2 to AC source 4. The low state at output pin 2 of comparator 64 is also applied through resistor 116 to input pin 6 of comparator 63 to cause output pin 1 to go high, which high level is applied through resistor 70 to input pin 4 of comparator 64 to complete the flip flop or latching action and provide a latched condition. Resistors 120, 122 and 124 provide pull-up resistors at the outputs of the respective comparators.

FIG. 4 shows application in a capacitor run motor with a run capacitor 130 connected between nodes 80 and 106 in series with auxiliary winding 2, where like reference numerals are used from FIG. 2 where appropriate to facilitate clarity. A higher voltage withstand capability is provided in the gate circuit of the power triac 74 by a pair of light responsive triacs 76a and 76b in series and optically triggered into conduction by respective LEDs 92a and 92b in series between node 52 and resistor 96. Capacitor 88 may be eliminated because of the presence of parallel capacitor 130 already in the circuit. Resistors 132 and 134 equalize and share voltage spikes or transients to prevent unwanted dv/dt turn-on.

The above described circuitry is like that shown in the above noted Wrege et al application, and like reference numerals are used where appropriate to facilitate clarity. Capacitors 117 and 119 have been added to provide further filtering at the inputs of respective voltage comparators 63 and 64.

As in the above noted Palaniappan application, the present invention provides an electronic system electrically sensing polarity reversal by the user via reversing switch 207–212 during the running mode and automatically reconnects auxiliary winding 2 to AC source 4. The present invention accomplishes this function with simplified circuitry, and reduced cost and part content. Another desirable feature of the present invention is that it is a simple add-on option for the above noted Wrege et al circuit with simple connections thereto, to be described, for those applications where instant reversing is desired.

Referring to FIG. 2, diode 14, resistors 44 46 and 94, zener diode 48 and capacitor 50 form the noted power supply and reference voltage at node 52 for comparators 61–64. Node 52 also provides a power supply and reference voltage for voltage comparators 221, 222 and 223, which are part of another quad comparator chip, such as an LM 339, wherein manufacturer designated pin number assignments are shown for clarity. Resistors 226, 228 and 230 are pull-up resistors at the outputs of respective comparators 221, 222 and 223, and capacitor 232 provides filtering for noise immunity. The voltage from node 52 on line 234 is reduced by a voltage divider formed by resistors 236 and 238 to provide a reference voltage at node 240 at plus input pin 5 used as a reference input to voltage comparator 221 and at minus input pin 6 used as a reference input to voltage comparator 222.

A main voltage detector circuit is provided through diode 242 connected to terminal T2 at node 104 for sensing the voltage across main winding 1. Main winding voltage is sensed through diode 242, and reduced at node 244 by the voltage divider formed by resistors 246 and 248 and filtered by capacitor 250 and clamped by zener diode 252. Capacitor 250 in conjunction with resistors 246 and 248 form an RC filter to remove transient voltage noise which may appear on the power line at T2. Half-wave rectified and filtered voltage is thus provided at node 244. An auxiliary voltage detector circuit is provided through diode 254 to sense the voltage across auxiliary winding 2. The auxiliary winding voltage is sensed from node 106 at T4 through diode 254 and reduced at node 256 by the voltage divider formed by resistors 258 and 260, and filtered by capacitor 262 and clamped by zener diode 264. In the disclosed embodiment, zener diodes 252 and 264 limit the voltage at respective nodes 244 and 256 and respective input pins 4 and 7 of respective comparators 221 and 222 to nine volts maximum, to ensure that comparators 221 and 222 are operated within their ratings. Also in the preferred embodiment, the voltage at the DC power supply line 234 is twelve volts and is divided down to four volts at node 240 as the reference input to pins 5 and 6 of respective comparators 221 and 222.

Figure 5:
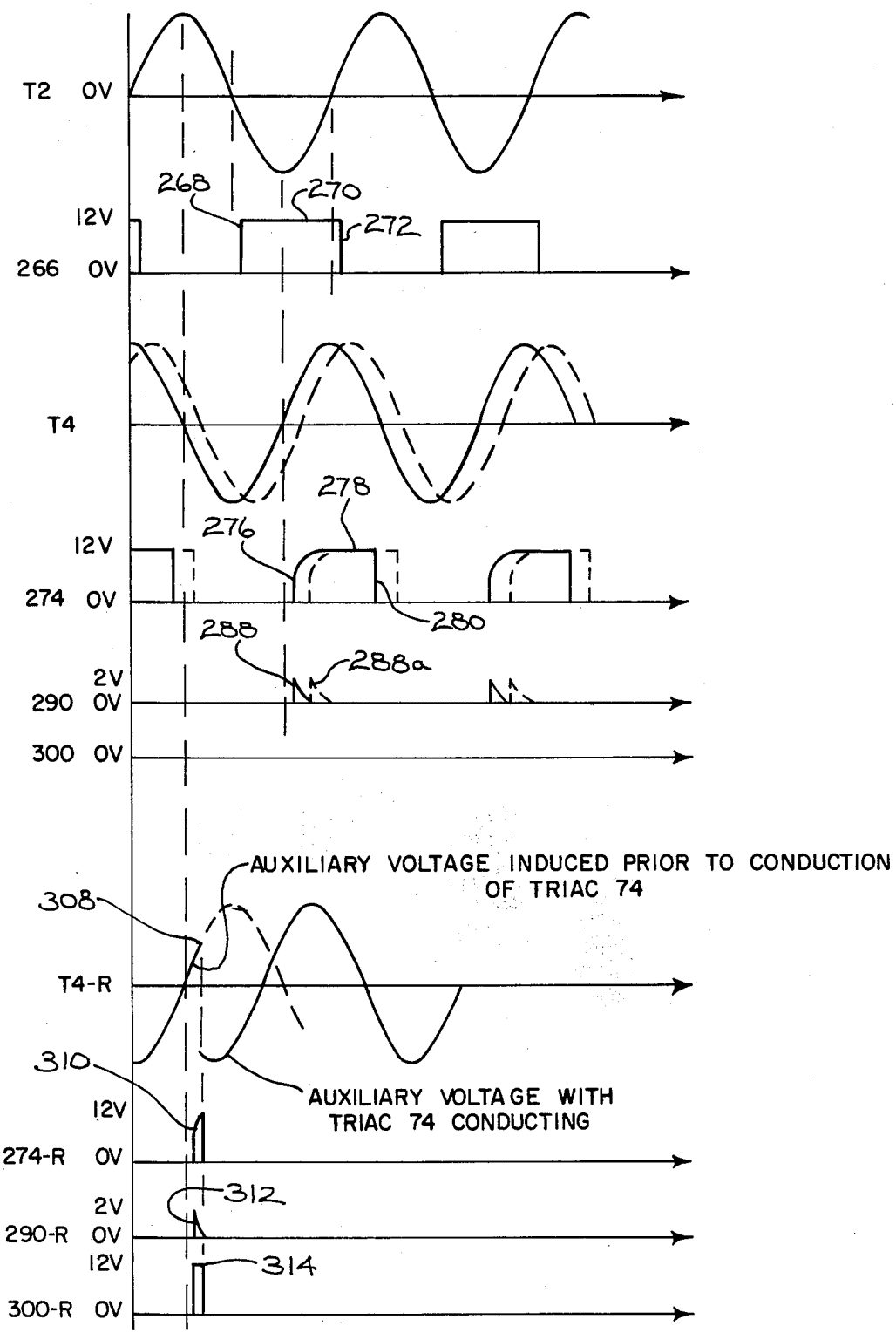
FIG. 5 is a wave form diagram illustrating operation of the instant reversing circuitry of FIG. 2 in accordance with the present invention.

Voltage comparator 221 has a reference input at pin 5 from the power supply and has a comparing input at pin 4 from the main voltage detector through diode 242 and compares main winding voltage at node 244 against the reference voltage at 240 and generates output pulses responsive to a given polarity and magnitude of main winding voltage relative to the reference voltage. Referring to FIG. 5, timing line T2 shows the voltage waveform at terminal T2 and node 104. Line 266 shows the waveform at output pin 2 of comparator 221 on line 266. When the main winding voltage at node 244 drops below the four volts at node 240, the output at pin 2 on line 266 transitions high as shown at 268, FIG. 5, to yield pulse 270 which lasts until the main winding voltage at node 244 rises above the four volts at node 240, at which time output pin 2 on line 266 transitions low as shown at transition 272 in FIG. 5.

Line T4 in FIG. 5 shows the auxiliary voltage waveform at terminal T4 and node 106. At initial turn-on, the auxiliary winding voltage leads the main winding voltage by approximately 90°, as shown by comparing the waveforms T2 and T4 in FIG. 5. After starting, while in the running mode of the motor, the auxiliary winding voltage will typically lead the main winding voltage by less than 90°, as shown in dashed line, though the leading factor may be 0° to 90°. Line 274 in FIG. 5 shows the output waveform from comparator 222 at pin 1 on line 274. When the auxiliary winding voltage at node 256 rises above the four volts at node 240, output pin 1 of comparator 222 on line 274 goes high as shown at transition 276, FIG. 5, to generate output pulse 278 which lasts until the auxiliary winding voltage at node 256 drops below the four volts at node 240, whereupon output pin 1 of comparator 222 on line 274 goes low as shown at transition 280.

Third voltage comparator 223 has a reference input at minus input pin 8 on line 266 from comparator 221, and has a comparing input at plus input pin 9 through a differentiator circuit 282 from the output of comparator 222 on line 274. Output pulse 278 on line 274 from comparator 222 is differentiated by capacitor 284 and supplied through diode 286 to yield pulse 288, FIG. 5, at node 290 at input pin 9 of comparator 223. In the disclosed embodiment, the voltage divider formed by the parallel combination of resistors 292 and 294 produce a pulse 288, FIG. 5, of two volts amplitude at node 290. Diode 286 prevents capacitor 284 from discharging through resistor 294, thus stretching the pulse width of pulse 288 preferably to two milliseconds. The width of pulse 288 is less than the width of pulse 270. Diode 286 limits discharge of capacitor 288 to stretch the width of differentiated pulse 288 and prevents negative pulses from appearing at input pin 9 of comparator 223. Resistors 292 and 294 are connected to a common return 296 relative to comparator 222. The other ends of resistors 292 and 294 are connected to respective nodes 298 and 290. Capacitor 284 charges through both resistors 292 and 294, but discharges only through resistor 292, to provide the noted stretched differentiated pulse. Diode 286 blocks discharge of capacitor 284 through resistor 294.

Line 300, FIG. 5, shows the output of comparator 223 at pin 14 on line 300. As seen in the timing diagram, the differentiated two volt pulse 288 at node 290 at comparing input pin 9 of comparator 223 occurs during the twelve volt pulse 270 on line 266 at input pin 8, and hence the output of comparator 223 at pin 14 on line 300 is low. This low signal prevents conduction of diode 302 which is connected by line 304 to node 306 at input pin 4 of comparator 64, such that the output of comparator 64 at pin 2 remains high, which maintains LED 92 nonconductive and hence triac 74 remains OFF and auxiliary winding 2 remains disconnected from AC source 4. The dashed waveforms in lines T4, 274 and 290 in FIG. 5 show how the auxiliary winding voltage at T4 phase shifts with respect to the line voltage at T2 during normal acceleration of the motor to running speed. During this acceleration, the shifted differentiated pulse 288a is still coincident with pulse 270, and the output of comparator 223 at line 300 remains low. As long as the auxiliary winding voltage leads the line voltage (rotation in either direction), there will be a low state at output pin 14 of comparator 223 on line 300.

When the user operates the reversing switch to open switches 207–209 and close switches 210–212, the polarity of the auxiliary winding voltage at terminal T4 is reversed, i.e., shifted by approximately 180° from a leading to a lagging position relative to the main winding voltage, as shown at timing line T4-R, FIG. 5. This voltage is induced in the auxiliary winding due to rotation of the motor and is instantaneously phase shifted by approximately 180° upon user actuation of the reversing switch. As the auxiliary winding voltage at node 256 and input pin 7 of comparator 222 rises through zero and reaches at 308, FIG. 5, the four volt level at node 240 and input pin 6, the output of comparator 222 on line 274 goes high as shown at transition 310 in timing line 274-R, which in turn generates differentiated pulse 312 as shown on timing line 290-R. Pulse 312 is non-coincident with pulse 270 on line 266 and instead occurs when the voltage on line 266 and input pin 8 of comparator 223 is zero or low, and hence the output of comparator 223 at pin 14 on line 300 goes high as shown at pulse 314 in timing line 300-R. This high signal is transmitted through diode 302 and line 304 to node 306 at input pin 4 of comparator 64 which in turn drives the output of comparator 64 at pin 2 low, which enables conduction through LED 92 which turns ON triac 74 and reconnects auxiliary winding 2 to AC source 4, thus applying reverse torque to the motor to slow the motor down and accelerate it in the opposite direction until cut-out by comparator 61 as above described. Node 306 is common to the output of comparator 62 at pin 14 through diode 114 and to the output of comparator 63 at pin 1 through resistor 70. Typically only a single pulse at output pin 14 of comparator 223 on line 300 is needed to accomplish reversing because during the first line cycle after triac 74 is conducting, the motor slows and the auxiliary winding voltage at node 42 is below the level at which a normal cut-out would occur. If the motor has not slowed sufficiently, e.g., due to contact bounce of the reversing switch, or the like, another positive pulse will be output from comparator 223 on line 300.

It is thus seen that the invention provides first voltage sensor means provided by comparator 221 sensing main winding voltage, second voltage sensor means provided by comparator 222 sensing auxiliary winding voltage, and third voltage sensor means provided by comparator 223 having reference input at line 266 and a comparing input at node 290 from the respective first and second voltage sensors and having an output at line 300 actuating start switch 74 to reconnect auxiliary winding 2 to AC source 4 upon polarity reversal by reversing switch 207–212 when operated by the user. The first voltage sensor outputs pulses 270, FIG. 5, responsive to a given polarity and magnitude of main winding voltage. The second voltage sensor outputs pulses 278, FIG. 5, responsive to a given polarity and magnitude of induced auxiliary winding voltage during the running mode of the motor, the induced auxiliary winding voltage being phase shifted by 0°–90° from the main winding voltage during the running mode. Differentiator circuit 282 differentiates output pulses 278 from the second sensor to pulses 288, FIG. 5, of reduced pulse width narrower than output pulses 270 from the first sensor. The third sensor at comparator 223 compares pulses 270 and pulses 288.

Upon polarity reversal, auxiliary winding voltage shifts approximately 180° relative to main winding voltage and the differentiated pulses 288 shift from a running mode position as shown on timing line 290, FIG. 5, to a polarity reversal position as shown at pulses 312 on timing line 290-R, FIG. 5, relative to the output pulses 270 from the first sensor, timing line 266. In the running mode position, the differentiated pulses 288 are coincident with output pulses 270. In the polarity reversal position, the differentiated pulses 312 are non-coincident with output pulses 270. Comparator 223 responds to the relative shifted output pulses to actuate start switch 74 to reconnect auxiliary winding 2 to AC source 4.

It is recognized that various alternatives and modifications are possible within the scope of the appended claims.

We claim:

1. In a single phase AC induction motor having a main winding and an auxiliary winding both connectable to an AC power source, and having start switch means for automatically connecting and disconnecting said auxiliary winding to and from said AC source in starting and running modes, respectively, and having a user operated reversing switch for reversing the voltage polarity applied from said AC source to one of said windings relative to the other of said windings, the improvement comprising means electrically sensing said polarity reversal during said running mode and automatically reconnecting said auxiliary winding to said AC source, said sensing means comprising:

first voltage sensor means sensing main winding voltage;

second voltage sensor means sensing auxiliary winding voltage;

third voltage sensor means comprising voltage comparator means having a reference input from one of said first and second voltage sensor means and having a comparing input from the other of said first and second voltage sensor means and having an output actuating said start switch means to reconnect said auxiliary winding to said AC source upon said polarity reversal;

differentiator means between one of said first and second voltage sensor means and said voltage comparator means of said third voltage sensor means and differentiating the respective one of said reference and comparing inputs to said voltage comparator means, wherein:

said first voltage sensor means outputs pulses responsive to a give polarity and magnitude of said main winding voltage;

said second voltage sensor means outputs pulses responsive to a give polarity and magnitude of induced auxiliary winding voltage during said running mode, said induced auxiliary winding voltage being phase shifted by 0°–90° from said main winding voltage during said running mode;

said differentiator means differentiates said output pulses from one of said first and second voltage sensor means to a reduced pulse width narrower than said output pulses from the other of said first and second voltage sensor means, said differentiated output pulses from said one voltage sensor means being compared against said output pulses from said other voltage sensor means by said voltage comparator means, such tht upon said polarity reversal the auxiliary winding voltage shifts 180° relative to the main winding voltage and said differentiated pulse shifts from a running mode position to a polarity reversal position relative to said output pulse from said other voltage sensor means, said differentiated pulse being coincident with said output pulse from said other voltage sensor means in one of said running mode and polarity reversal positions, said differentiated pulse being non-coincident with said output pulse from said other voltage sensor means in the other of said running mode and polarity reversal positions.

2. In a single phase AC induction motor having a main winding and an auxiliary winding both connectable to an AC power source, and having start switch means for automatically connecting and disconnecting said auxiliary winding to and from said AC source in starting and running modes, respectively, and having a user operated reversing switch for reversing the voltage polarity applied from said AC source to one of said windings relative to the other of said windings, control circuitry comprising:

main voltage detector means for sensing the magnitude of main winding voltage;

auxiliary voltage detector means for sensing the magnitude of auxiliary winding voltage;

a first voltage comparator responsive to said main and auxiliary voltage detector means and comparing the magnitude of the auxiliary winding voltage against the magnitude of the main winding voltage and outputting a turn-off signal when the magnitude of the auxiliary winding voltage increases to a predetermined cut-out value relative to the magnitude of the main winding voltage as a function of motor speed corresponding to a given cut-out speed;

a second voltage comparator responsive to said main and auxiliary voltage detector means and comparing the magnitude of the auxiliary winding voltage against the magnitude of the main winding voltage and outputting a turn-on signal when the magnitude of the auxiliary winding voltage decreases to a predetermined cut-in value relative to the magnitude of the main winding voltage as a function of motor speed corresponding to a given cut-in speed, said predetermined cut-in value being a stall or overload condition voltage derived from rotationally induced voltage in said auxiliary winding during running of said motor after starting, said given cut-in speed being less than said given cut-out speed;

a third voltage comparator responsive to the output of said first voltage comparator to output a turn-off signal in response to said turn-off signal from said first voltage comparator;

a fourth voltage comparator responsive to the output of said second voltage comparator and responsive to the output of said third voltage comparator, said fourth voltage comparator being responsive to said turn-off signal from said third voltage comparator to output a turn-off signal to said start switch to disconnect said auxiliary winding from said AC source, said fourth voltage comparator being responsive to said turn-on signal from said second voltage comparator to output a turn-on signal to said start switch to connect said auxiliary winding to said AC source;

power supply means connected to said AC source and providing rectified voltage as the power source for each of said comparators, and also providing a reference voltage;

second main voltage detector means for sensing main winding voltage;

second auxiliary voltage detector means for sensing auxiliary winding voltage;

a fifth voltage comparator having a reference input from said power supply means and having a comparing input from said second main voltage detector means and comparing said main winding voltage against said reference voltage and generating output pulses responsive to a given polarity and magnitude of said main winding voltage relative to said reference voltage;

a sixth voltage comparator having a reference input from said power supply means and having a comparing input from said second auxiliary voltage detector means and comparing said auxiliary winding voltage against said reference voltage and generating output pulses responsive to a given polarity and magnitude of said auxiliary winding voltage relative to said reference voltage;

a seventh voltage comparator having a reference input from the output of said fifth voltage comparator and having a comparing input from the output of said sixth voltage comparator, such that upon said polarity reversal one of the main and auxiliary winding voltage shifts approximately 180° from a leading to a lagging position relative to the other winding voltage, and the output pulse from one of said fifth and sixth voltage comparators shifts relative to the output pulse from the other of said fifth and sixth voltage comparators, and said seventh voltage comparator responds to said relative shifted output pulse to actuate said start switch to reconnect said auxiliary winding to said AC source.

3. The invention according to claim 2 wherein:

said third voltage comparator compares the output of said first voltage comparator against said reference voltage and outputs a turn-off signal responsive to said turn-off signal from said first voltage comparator rising in a given polarity direction to a predetermined value relative to said reference voltage;

the output of said second voltage comparator and the output of said third voltage comparator are connected together at a common node;

said fourth voltage comparator compares the voltage at said common node against said reference voltage and outputs said turn-off signal to said start switch means when the voltage at said common node decreases in a given polarity direction to a predetermined turn-off value relative to said reference voltage, and wherein said fourth voltage comparator outputs said turn-on signal to said start switch when the voltage at said common node increases in a given polarity direction to a predetermined turn-on value relative to said reference voltage;

the output of said fourth voltage comparator is applied to an input of said third voltage comparator which is responsive to said output of said first voltage comparator, such that said turn-on signal from said fourth voltage comparator is also applied to said third voltage comparator such that the latter outputs said turn-on signal therefrom which is applied to an input of said fourth voltage comparator which also receives said output of said second voltage comparator to ensure that said fourth voltage comparator continues to generate said turn-on signal from the output thereof, and such that said turn-off signal from said output of said fourth voltage comparator is also applied to said input of said third voltage comparator which receives said output of said first voltage comparator such that said third voltage comparator outputs said turn-off signal to said input of said fourth voltage comparator which also receives said output of said second voltage comparator and ensures that said fourth voltage comparator continues to generate said turn-off signal, to provide latching flip flop action;

the output of said seventh voltage comparator is connected to said common node connecting said output of said second voltage comparator and said output of said third voltage comparator at the input to said fourth voltage comparator.

4. The invention according to claim 3 wherein:

said second main voltage detector means comprises a diode and a voltage divider network connected across said main winding;

said second auxiliary voltage detector means comprises a diode and a voltage divider network connected across said auxiliary winding;

each of said fifth and sixth voltage comparators has plus and minus inputs;

the plus input of said fifth voltage comparator is a reference input and is connected to said power supply means and receives said reference voltage;

the minus input of said sixth voltage comparator is a reference input and is connected to said power supply means and receives said reference voltage;

the minus input of said fifth voltage comparator is a comparing input and is connected to said voltage divider network of said second main voltage detector means;

the plus input of said sixth voltage comparator is a comparing input and connected to said voltage divider network of said second auxiliary voltage detector means.

* * * * *